Figures 1, 2:
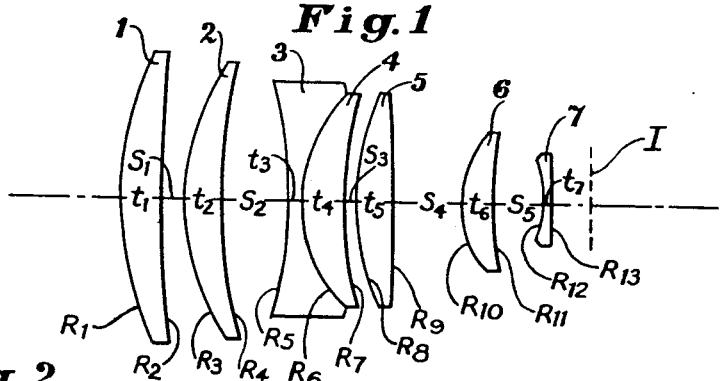

July 22, 1952      W. SCHADE      2,604,013

ULTRAHIGH-APERTURE FIVE COMPONENT OBJECTIVES

Filed Aug. 8, 1951

| F=100mm | | | | f/0.75 |
|---|---|---|---|---|
| Lens | N | V | Radii | Thicknesses |
| 1 | 1.611 | 58.8 | $R_1 = +144.45$mm | $t_1 = 15.12$mm |
|   |       |      | $R_2 = +533.5$ | $S_1 = 8.78$ |
| 2 | 1.611 | 58.8 | $R_3 = +106.34$ | $t_2 = 16.48$ |
|   |       |      | $R_4 = +263.3$ | $S_2 = 30.32$ |
| 3 | 1.720 | 29.3 | $R_5 = -177.84$ | $t_3 = 7.56$ |
| 4 | 1.734 | 51.2 | $R_6 = +62.83$ | $t_4 = 20.16$ |
|   |       |      | $R_7 = +193.16$ | $S_3 = 3.65$ |
| 5 | 1.611 | 58.8 | $R_8 = +103.06$ | $t_5 = 15.75$ |
|   |       |      | $R_9 = -873.8$ | $S_4 = 32.07$ |
| 6 | 1.697 | 56.2 | $R_{10} = +42.61$ | $t_6 = 15.22$ |
|   |       |      | $R_{11} = +177.00$ | $S_5 = 21.07$ |
| 7 | 1.523 | 58.6 | $R_{12} = -46.97$ | $t_7 = 3.54$ |
|   |       |      | $R_{13} = \infty$ |  |

*Willy Schade*
INVENTOR.

BY *Daniel I. Mayne,*
*Harold F. Bennett*
ATT'Y. & AGT.

Patented July 22, 1952

2,604,013

UNITED STATES PATENT OFFICE 2,604,013

ULTRAHIGH-APERTURE FIVE COMPONENT OBJECTIVES

Willy Schade, Rochester, N. Y., assignor to Eastman Kodak Company, Rochester, N. Y., a corporation of New Jersey Application August 8, 1951, Serial No. 240,932

3 Claims. (Cl. 88—57)

This invention relates to high aperture objectives for photography and projection.

An object of the invention is to provide an extremely high aperture objective covering a moderate field which is comparatively simple in structure and economical to manufacture.

A particular object of the invention is to provide an objective suitable for photography and projection under conditions of low illumination and particularly for photographing fluorescent screens such as X-ray and radar screens on a reduced scale.

In my copending application, Serial No. 178,835, filed August 11, 1950, now Patent No. 2,586,866, issued February 26, 1952, I have described a group of high aperture five-component objectives working at apertures of about $f/1.5$ to about $f/1.1$ and particularly suitable for projecting a cathode ray tube image onto a larger screen. These objectives have curved fields, and either the face of the cathode ray is to be curved (concave) correspondingly or a negative component is to be placed next to the short-conjugate plane to flatten the field in known manner.

The present invention is a further development of that described in the above-mentioned application by which I have been able to produce objectives having apertures up to $f/0.75$ and covering a field of view up to about $\pm 7°$. A negative field-flattening component is provided near the short-conjugate plane in known manner when the conditions of use require a flat field.

According to the present invention, an ultrahigh aperture photographic objective is made up comprising five air-spaced components of which the front two and the rear two are positive and the center one is negative, at least four of the five components being simple lens elements. By the front is meant the side facing the longer conjugate, in accordance with the usual convention.

The first and second components (counting from the front) are comparatively weak, having focal lengths between $2f$ and $4f$ and preferably between $2.5f$ and $4f$, where $f$ is the focal length of the objective, and the front surfaces of these components are convex and have radii of curvature between $1.1f$ and $1.8f$ and between $0.8f$ and $1.5f$ respectively. The middle component is biconcave and has a focal length between $-0.7f$ and $-2f$ and preferably between $-0.8f$ and $-1.8f$ and the radius of curvature of its front surface is between 0.5 and 1.5 times the radius of curvature of its rear surface. As in my copending application, I find it advantageous to assign to the fourth component a focal length of between $0.8f$ and $2.5f$ and to have the radius of curvature of its front surface between $0.5f$ and $2f$. On the other hand, I find it advantageous to space the fifth component farther from the fourth than is shown in my copending application and to make it meniscus or plano-convex with its front surface convex and to assign to it a focal length between $0.5f$ and $1.5f$. The rear surface of the fifth component should have a radius of curvature numerically greater than $f$.

These five components are mounted in axial alignment and separated by four airspaces of which the first and third are preferably between zero and $0.15f$ inclusive and the second and fourth are between $0.2f$ and $0.4f$. The requirements of color correction according to known rules calls for a greater difference in dispersive index between the negative component and the positive components than can be provided by making each component of a single element of commercially available glass. Accordingly, one of the components, preferably an interior component (i. e. the second, third, or fourth), is made up as a "hyperchromat," that is as a cemented doublet consisting of a positive element of low-dispersion glass and a negative element of relatively high-dispersion glass, the curvature of the cemented surface being computed by known rules to provide axial color correction. The cemented surface may be given considerable dioptric power by choosing two glasses which differ in refractive index without departing from the spirit of the invention, but I find it more convenient to use a so-called "buried surface," that is a cemented surface joining two media of substantially the same refractive index so that the radius of curvature may be varied during the design of the objective without noticeably affecting the monochromatic aberrations. The correction of lateral color is accomplished partly by choosing which component is to be made compound and partly by choosing dispersive indices for the first and fifth components which approximately correct the lateral color and finally by slightly varying the powers of these outer components for fine adjustment of lateral color. Making the second component compound instead of the third makes the blue image smaller relative to the yellow, and making the fourth component compound instead has the opposite effect.

Optionally, a supplementary negative component is mounted close to and in front of the short conjugate (image or object) plane to flatten the field in known manner. This component has only a small effect on the spherical aberration and color corrections, and this slight effect is easily allowed for by slight changes in the other components without making the supplementary component itself compound.

Preferably, the algebraic sum of the powers of the eight surfaces of the positive components is between 2.2 and 2.8 times the power of the whole five-component objective.

In the accompanying drawing:

Fig. 1 shows in diagrammatic axial section an objective according to the invention combined with a field-flattening component, and Fig. 2 gives constructional data for a specific example of the optical system of Fig. 1.

In Fig. 1 an objective consisting of four positive lens components 1, 2, 5 and 6, and a negative doublet 3, 4 is shown in diagrammatic axial section and a negative field-flattening component 7 is shown combined therewith.

In Fig. 2 a table of data is given for a specific objective according to the invention combined with a field-flattening component as in Fig. 1 and specifically designed to be made up in a 110 mm. focal length for photographing X-ray fluoroscope screens onto 35 mm. film at a 16 to 1 reduction. This table is repeated below.

| Lens | N | V | Radii | Thicknesses |
|---|---|---|---|---|
| | | | $F=100$ mm. $f/0.75$ | |
| | | | Mm. | Mm. |
| 1 | 1.611 | 58.8 | $R_1 = +144.45$ | $t_1 = 15.12$ |
| | | | $R_2 = +533.5$ | $s_1 = 8.78$ |
| 2 | 1.611 | 58.8 | $R_3 = +106.34$ | $t_2 = 16.48$ |
| | | | $R_4 = +263.3$ | $s_2 = 30.32$ |
| 3 | 1.720 | 29.3 | $R_5 = -177.84$ | $t_3 = 7.56$ |
| 4 | 1.734 | 51.2 | $R_6 = +62.83$ | $t_4 = 20.16$ |
| | | | $R_7 = +193.16$ | $s_3 = 3.65$ |
| 5 | 1.611 | 58.8 | $R_8 = +103.06$ | $t_5 = 15.75$ |
| | | | $R_9 = -873.8$ | $s_4 = 32.07$ |
| 6 | 1.697 | 56.2 | $R_{10} = +42.61$ | $t_6 = 15.22$ |
| | | | $R_{11} = +177.00$ | $s_5 = 21.07$ |
| 7 | 1.523 | 58.6 | $R_{12} = -46.97$ | $t_7 = 3.54$ |
| | | | $R_{13} = \infty$ | |

The dimensions of the optical system as originally designed are scaled down so that the focal length F is 100 mm. for the whole system consisting of objective 1 to 6 and field flattener 7. The focal length $f$ of the objective alone is 97.0 mm. The image plane I (Fig. 1) is at 6.6 mm. from the rear surface $R_{13}$ in this example when focused at a magnification of $\frac{1}{16}$.

In this table the first column lists the lens elements as numbered from front to rear, the second and third columns give the refractive index N for the D line of the spectrum and the dispersive index V of each element, and the last two columns give the radii of curvature R of the lens surfaces, the thicknesses $t$ of the elements, and the spaces $s$ between components, each numbered by subscript from front to rear. The + and − values of the radii indicate surfaces which are respectively convex and concave to the front.

In this example the focal lengths of the five components of the objective are approximately $+3.3f$, $+2.9f$, $-1.3f$, $+1.55f$, and $+0.8f$ respectively in accordance with the invention and the algebraic sum of the powers of the surfaces of the positive components is $+2.5f$ in accordance with a preferred feature of the invention. The focal length of the supplementary component is approximately $-0.9f$. It is directly apparent from the table that the radii of curvature and the spacings are within the ranges above set forth.

In the highly preferred form of the invention shown herein in which the negative component is compounded of a positive element and a negative element, I find it advantageous to make each element of a glass having a refractive index between 1.60 and 1.78, to make the thickness of the negative element between $0.05f$ and $0.15f$ and that of each positive element between $0.10f$ and $0.25f$, and to make the radius of curvature of each glass-air surface within the range set forth in the following table of algebraic inequalities:

| | | |
|---|---|---|
| $1.1f$ | $<+R_1$ | $<1.8f$ |
| $3\ f$ | $<+R_2$ | $<\infty$ |
| $0.8f$ | $<+R_3$ | $<+1.5f$ |
| $1.5f$ | $<+R_4$ | $<3\ f$ |
| $1.3f$ | $<-R_5$ | $<2.4f$ |
| $1.4f$ | $<+R_7$ | $<2.5f$ |
| $0.7f$ | $<+R_8$ | $<1.4f$ |
| $2\ f$ | $<-R_9$ | $<\infty$ |
| $0.3f$ | $<+R_{10}$ | $<0.7f$ |
| $f$ | $<+R_{11}$ | $<5\ f$ |

It will be noted that $R_6$ is omitted from this list, since the radius of curvature of the cemented surface is determined by the known rules of color correction as above described and may be either positive or negative at the option of the designer.

By means of the features of the invention hereinbefore described and particularly by the specifically defined radii of curvature of the preferred form of the invention I have produced the extremely high aperture objective above described which copies X-ray screens with sharpness more than adequate to reproduce all the details discernible on the original screen.

I claim:

1. A highly corrected ultra-high-aperture photographic objective comprising five airspaced components of which four are simple lens elements, of which one of the interior components consists of a positive and a negative element cemented together, and of which the first and second components counting from the front are positive and have focal lengths between $2f$ and $4f$ where $f$ is the focal length of the objective, the third component is biconcave and has a focal length between $-0.8f$ and $-1.8f$, and the fourth and fifth components are positive and have focal lengths between $0.8f$ and $2.5f$ and between $0.5f$ and $2f$ respectively, the shapes of the components being such that the front surfaces of the first and second components are convex and have radii of curvature between $1.1f$ and $1.8f$ and between $0.8f$ and $1.5f$ respectively, the front surface of the third component has a radius of curvature numerically between 0.5 and 1.5 times that of the rear surface thereof, the front surface of the fourth component is convex and has a radius of curvature between $0.5f$ and $2f$, and the rear surface of the fifth component is plane or concave and has a radius of curvature between $f$ and infinity inclusive, and in which the axial distances between the first and second components and between the third and fourth components are between zero and $0.15f$ inclusive and the distances between the second and third components and the fourth and fifth components are between $0.2f$ and $0.4f$, and each lens element is made of a glass having a refractive index between 1.60 and 1.78.

2. An objective according to claim 1 in which the algebraic sum of the powers of the eight surfaces of the positive components is between 2.2 and 2.8 times the power of the objective as a whole.

3. A highly corrected photographic objective comprising a cemented negative doublet component and four simple positive components axially aligned therewith, two being in front thereof and two behind, in which the doublet consists of two elements of substantially the same refractive index namely a positive element of relatively low-dispersion glass and a negative element of relatively high-dispersion glass, the cemented surface being curved to provide axial color correction, in which the radii of curvature R of the glass-air surfaces are within the limits set forth in the following table of algebraic inequalities:

| | | |
|---|---|---|
| $1.1f$ | $<+R_1$ | $<1.8f$ |
| $3f$ | $<+R_2$ | $<\infty$ |
| $0.8f$ | $<+R_3$ | $<1.5f$ |
| $1.5f$ | $<+R_4$ | $<3f$ |
| $1.3f$ | $<-R_5$ | $<2.4f$ |
| $1.4f$ | $<+R_7$ | $<2.5f$ |
| $0.7f$ | $<+R_8$ | $<1.4f$ |
| $2f$ | $<-R_9$ | $<\infty$ |
| $0.3f$ | $<+R_{10}$ | $<0.7f$ |
| $f$ | $<+R_{11}$ | $<\infty$ | wherein $f$ is the focal length of the objectives, the radii R are numbered by subscripts with respect to all the surfaces of the objective in order from front to rear, and the $+$ and $-$ signs denote surfaces respectively convex and concave to the front, and in which objective each element is made of a glass having a refractive index between 1.6 and 1.78, each positive element has an axial thickness between $0.10f$ and $0.25f$, the one negative element has a thickness between $0.05f$ and $0.15f$, the first and third airspaces between components counting from the front are each between zero and $0.15f$, and the second and fourth are between $0.2f$ and $0.4f$.

WILLY SCHADE.

REFERENCES CITED

The following references are of record in the file of this patent:

UNITED STATES PATENTS

| Number | Name | Date |
|---|---|---|
| 1,839,011 | Bielicke | Dec. 29, 1931 |
| 2,106,077 | Tronnier | Jan. 18, 1938 |
| 2,187,780 | Gehrke et al. | Jan. 23, 1940 |
| 2,346,061 | Altman | Apr. 4, 1944 |
| 2,348,667 | Warmisham | May 9, 1944 |